April 22, 1969 J. MERCIER 3,439,712
LOCKING MEMBER FOR LIQUID OUTLET PLUG OF PRESSURE ACCUMULATOR
Filed Dec. 29, 1966 Sheet 1 of 2
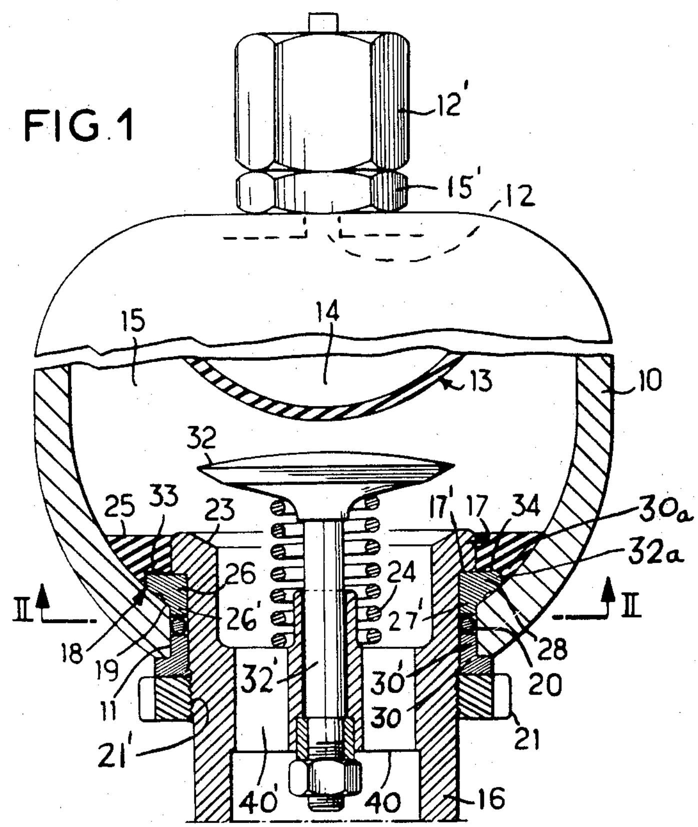
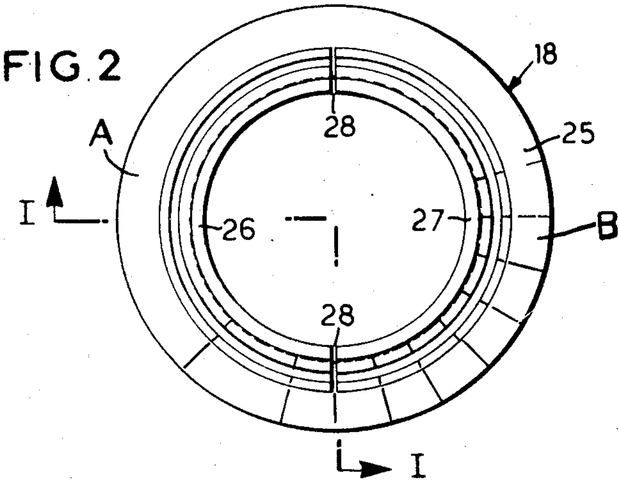
INVENTOR
JEAN MERCIER
BY
ARTHUR B. COLVIN
ATTORNEY

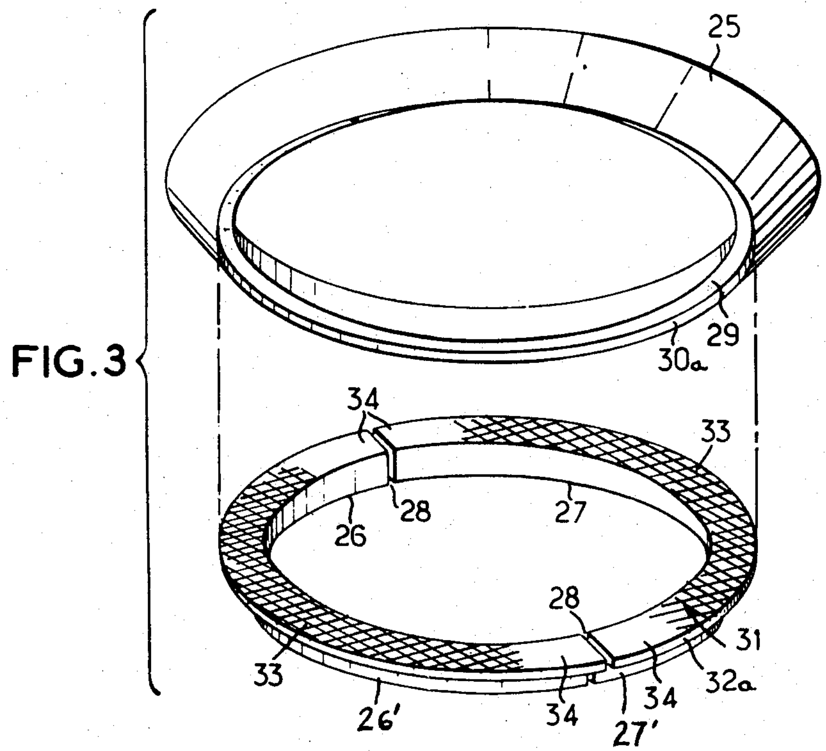
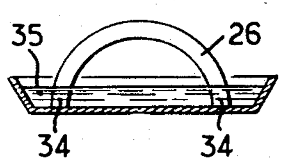
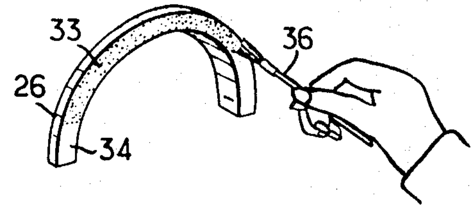
INVENTOR
JEAN MERCIER
BY
ARTHUR B. COLVIN
ATTORNEY United States Patent Office 3,439,712

Patented Apr. 22, 1969

1

3,439,712

LOCKING MEMBER FOR LIQUID OUTLET PLUG OF PRESSURE ACCUMULATOR

Jean Mercier, 501 Bloomfield Ave., Caldwell, N.J. 07006

Filed Dec. 29, 1966, Ser. No. 605,839
Claims priority, application France, Jan. 18, 1966, 46,239
Int. Cl. F16l 55/00
U.S. Cl. 138—30 4 Claims In pressure accumulators of the type that comprise a rigid shell or container having a gas port and a liquid port with an intervening deformable partition, which may be a rubber bladder filled with gas under pressure through the gas port, the liquid port generally has a plug therein by means of which the accumulator may be connected to the liquid source and to the equipment to be operated.

Where the plug is screwed into the liquid port, high pressure operation becomes hazardous, because under such pressure the threads may be sheared off and the plug hurled out at high velocity with likelihood of possible fatal injury to the operator and of damage to equipment and this may occur in disassembly of the accumulator for maintenance or repair should the mechanic neglect first to release all of the pressure from the inflated bladder.

To overcome such difficulties a plug may be utilized having a reduced neck forming an enlarged inner end portion defining a shoulder of smaller outside diameter than the liquid port so that it may be inserted therein. A locking member in the form of a ring encompassing the reduced neck portion of the plug, has an outer diameter greater than that of said port and an inner periphery overlapped by the enlarged end portion of the plug and is seated in position intervening between the inner rim of the port and said shoulder. By means of any suitable retaining element such as a nut screwed on the externally threaded neck of the plug which protrudes from the liquid port, the plug may be releasably, yet securely affixed to said shell. As the locking ring is of greater diameter than the liquid port, in order that it may be inserted therethrough into the accumulator shell, it is made deformable as by having portions thereof relatively displaceable. Where to permit such deformation the locking ring is of resilient metal having one or more splits through the circumference thereof, such as a split ring of hardened spring steel, the bladder as it expands to expel liquid from the accumulator, will come in contact with the circumference of such ring and especially at high pressures, extrude through such splits, thereby pinching, cutting and destroying the bladder.

Where, to prevent extrusion of the bladder, the locking member comprises a plurality of rigid arcuate segments to the entire top surface of which is bonded as by cementing or gluing, for example, a ring of resilient material such as natural or synthetic rubber or some other suitable plastic which may readily be deformed and is self-restoring to its original shape, although the spaces or intervals between the ends of adjacent rigid segments will be covered to prevent extrusion of the bladder, other difficulties arise.

Thus, when the locking member is deformed, in order to permit its insertion into the accumulator shell, as by folding along an axis passing through diametrically opposed spaces between the ends of the rigid segments, due to the stresses imparted to the bond connection between the resilient ring and the segments at the region adjacent the ends of the segments, the resultant local fatigue will cause the bond to quickly break at such region of folding and tearing of the resilient ring itself may also occur.

It is accordingly among the objects of the invention to provide a locking member for the outlet plug of an accumulator which has no splits or discontinuities in its circumference into which the accumulator bladder might extrude with resultant injury to or destruction of such bladder, yet may readily be deformed for insertion into the liquid port thereof, without stresses being imparted to the resilient ring which might cause tearing thereof and without breakage of the bond between the resilient ring and the rigid arcuate segments.

2

According to the invention, the locking member comprises a plurality of rigid arcuate segments to the top surfaces of which is secured a resilient ring of natural or synthetic rubber or some other suitable plastic which may readily be deformed and is self restoring to its original shape.

The rigid segments are positioned so that the spaces between the adjacent ends thereof will be diametrically aligned and each of the segments has a flat top surface to which the undersurface of the resilient ring is bonded as by cementing or gluing. More particularly the bond between the resilient ring and the segments does not extend to the ends of the segments, so that free relative movement is provided between the portions of the resilient ring aligned with the portions of the segments adjacent the ends thereof, to prevent stress to the resultant ring at such portions.

In the accompanying drawings in which are shown one of various possible embodiments of the several features of the invention:

FIG. 1 is a longitudinal sectional view with parts broken away of an accumulator embodying the invention herein, taken along line I—I of FIG. 2;

FIG. 2 is a plan view of the locking member taken along line II—II of FIG. 1;

FIG. 3 is an exploded perspective view of the locking member;

FIG. 4 shows one of the rigid arcuate segments being dipped to prevent adhesion of the bonding material to the ends thereof; and FIG. 5 illustrates the application of the bonding material to the rigid arcuate segment.

Referring now to the drawings, the pressure accumulator desirably comprises a pressure resistant vessel, illustratively a rigid shell 10 having opposed ports 12 and 11 therein, one of said ports, illustratively port 12, being of smaller diameter than the other. Desirably the smaller diameter port 12 is provided for the stem (not shown) of a standard pneumatic valve which is affixed to the shell by nuts 12′ and 15′ and the larger diameter port 11, which serves as the liquid port, is formed large enough to pass an accumulator bladder 13 therethrough.

The bladder 13 which is formed of resilient material such as rubber or synthetic plastic of like physical characteristics is capable of collapsing or expanding in use and in distended but substantially unstretched condition is smaller than the cavity of the shell 10. The bladder thus defines two chambers 14, 15 in the shell adapted to be charged with gas and liquid respectively under pressure.

Positioned in the liquid port is a closure assembly which desirably comprises a plug 16, preferably a tubular member which has a flange 17 at its inner end defining an annular shoulder 17′. A locking member 18, illustratively a ring of greater outer diameter than said port 11 and deformable to permit its insertion thereinto, encompasses said plug 16 and is seated on the rim 19 of port 11, the inner diameter of said ring 18 being less than the outer diameter of shoulder 17′ so that said shoulder may seat on said ring.

More particularly, as shown in the drawings, the locking member 18 comprises a pair of rigid arcuate segments 26, 27, preferably of steel and each having a flat top surface 31. The segments 26, 27 when juxtaposed, as shown in FIGS. 1 to 3, define a ring of inner diameter less than the outer diameter of flange 17 so that the shoulder 17' of flange 17 may seat on the inner periphery of said segments and of outer diameter such that the substantially beveled side walls thereof may seat on the inner wall of shell 10 adjacent rim 19 of port 11.

Desirably, each of the segments 26, 27 has an arcuate rib 26', 27' formed integral therewith on the undersurface thereof, which may be positioned between the outer surface of plug 16 and the wall of port 11 to substantially fill the space therebetween, thereby to prevent lateral displacement of the plug 16.

Encompassing said plug 16 and in juxtaposition with said port 11 is a rubber gasket 20 which serves effectively to prevent leakage between the wall of port 11 and the outer surface of plug 16. More particularly, a sleeve 30 encompasses plug 16 and has an integral rib 30' which also extends into the space between the outer surface of plug 16 and the wall of port 11. Thus, when a nut 21 is screwed on the externally threaded portion 21' of plug 16 it will move the latter outwardly securely to retain the plug in position and will compress gasket 20 between ribs 26', 27' and 30' to provide an effective seal.

Desirably positioned in said plug 16 is a poppet valve comprising a valve head 32 adapted to seat on the beveled mouth 23 of plug 16 and having a stem 32' preferably formed integral therewith. Stem 32' is slidably mounted in an axial bore in said plug 16 defined in a transverse wall 40 therein which has openings 40' therethrough, for passage of fluid. The valve head 32 is normally retained in open position by means of a coil spring 24.

With the construction of the locking member thus far described, it is apparent that the adjacent ends 34 of the rigid segments define a space 28 therebetween as shown in FIG. 3.

In order to cover such space to prevent extrusion of the bladder 13 therethrough, a resilient ring 25 is provided, preferably of natural or synthetic rubber or some other suitable plastic which may readily be deformed and is self-restoring to its original shape. As shown, the inner diameter of ring 25 is greater than that of the ring defined by the juxtaposed arcuate segments 26, 27 and the outer diameter of the resilient ring is greater than that of the ring defined by the rigid arcuate segments. The outer periphery of the resilient ring is curved to conform to the curvature of the shell adjacent port 11.

The resilient ring is bonded to the flat top surface 31 of the rigid arcuate segments to form an integral assembly.

To this end a suitable bonding material such as glue or cement is deposited as at 33 on the flat top surface 31 of the segments 26, 27 in such manner that the end portions 34 and the peripheral portions **32*a* of each of the segments is devoid of such bonding material. To facilitate such preparation of the segments, the ends 34 thereof are first coated so that the bonding material will not adhere thereto. This may be accomplished as illustratively shown in FIG. 4 by dipping the ends 34 of each segment in a suitable bath 35** such as a solution of silicone.

Thereupon, the bonding material such as glue, is applied as by brushing 36 onto the portion 33 of the segments which covers the entire flat surface 31 thereof except the end portions 34. Even if some glue should inadvertently flow to such end portions 34, due to the silicone coating thereon, the glue will not adhere thereto.

Thereupon, the resilient ring and the prepared segments are assembled in such manner that the bearing surface 29 of the resilient ring will be in contact with the coated surfaces 33 of the segments, the flange **30*a* of the ring encompassing the peripheries 32*a* of the segments and locating the latter so that the inner periphery of the segments will be exposed as shown in FIG. 1, to provide a bearing surface for the annular shoulder 27' of flange 27**.

In assembling the accumulator, the bladder 13 is pushed through the port 11 of the empty shell 10. The valve (not shown) is pushed through the port 12 and secured to the shell as by nuts 12', 15'. The plug 16 is then passed through port 11 and the locking member 18 is deformed as by folding together the portions A–B thereof, on each side of the diametrically aligned spaces 28, so that it may be passed through port 11. The locking member 18 is then released and by reason of its resilience, will assume its original shape so that it may readily be passed around the plug 16, the plug 16 is then pulled outwardly so that the annular shoulder 17' thereof will seat against the inner periphery of the segments 26, 27 with the beveled periphery of the latter seating against the rim 19 of the shell and the curved periphery of the resilient ring against the inner surface of the shell.

The gasket 20 and sleeve 30 are then positioned around plug 16 and the nut 21 is screwed thereon to lock the assembly in position.

With the construction of the deformable locking member 18, above described, as the entire upper surface thereof contacted by the inflated bladder 13 in expansion thereof is the associated uninterrupted resilient ring 25, the spaces 28 between the rigid arcuate segments 26, 27 will be isolated from the bladder to prevent extrusion of the latter through such spaces. As a result, there is no likelihood of pinching, cutting and destruction of the bladder with resultant failure of the pressure accumulator.

In disassembling the accumulator, it is necessary first to push the plug 16 inwardly, after the nut 21 has been removed so that the locking member 18 may be slipped off the neck of the plug 16 and deformable for removal through port 11. If there is any air pressure in the bladder 13, the latter will press against such plug 16 and prevent displacement thereof. It is apparent therefore, that in disassembly of the accumulator, a mechanic cannot neglect first to release all of the air pressure remaining in the bladder and consequently there is no danger of injury as a result of the plug 16 being blown out of the container.

By reason of the fact that the resilient ring 25 is not bonded to the rigid segments adjacent the ends 34 of the latter, when the locking member is folded as previously described, the material of the resilient ring 25 adjacent the fold line will be able to stretch without restraint, and hence no local fatigue will be imparted thereto which could cause failure of the locking member.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. In a pressure vessel of the type having a port with a deformable partition secured therein and adapted to move toward such port and having a hollow flanged plug in said port, said flange defining a shoulder; the combination therewith of a locking member for said plug, said locking member comprising a plurality of rigid arcuate segments defining a ring of inner diameter less than that of the port and of outer diameter greater than that of such port, adjacent ends of said segments being in relatively close juxtaposition to define substantially a continuous surface, the undersurface of said segments adjacents the outer periphery thereof having a configuration complementary to that of the inner surface of the pressure vessel adjacent its port and defining a relatively wide surface adapted to seat directly on said inner surface of said port, an annulus of resilient material bonded to the portion of the top surface of said arcuate segments spaced from the ends of the latter and coaxial with the ring formed thereby, said annulus having an inner diameter greater than the inner diameter of the ring formed by said rigid arcaute segments, whereby the exposed surfaces of said segments adjacent the inner periphery thereof define a retaining shoulder for the shoulder of such plug, and an outer diameter greater than the outer diameter of said ring so as to overlap its outer periphery, whereby said overlapping portion of the annulus, when the expanded partition is thereagainst will prevent extrusion through the spaces between the segments and the shell of the accumulator as well as through the spaces between adjacent ends of said segments.

2. The combination set forth in claim 1 in which the end of the rigid arcuate segments are coated with a release agent to prevent adhesion of the bonding material thereto.

3. The combination set forth in claim 1 in which the bonding material is a glue and the ends of the rigid arcuate segments are coated with a release agent to prevent adhesion of the glue thereto.

4. The combination set forth in claim 3 in which the release agent is a solution of silicone.

References Cited

UNITED STATES PATENTS

| | | | |
|---|---|---|---|
| 3,230,975 | 1/1966 | Mercier | 138—30 |
| 3,232,318 | 2/1966 | Mercier | 138—30 |
| 3,316,939 | 5/1967 | Mercier | 138—30 |

PATRICK D. LAWSON, *Primary Examiner.*